United States Patent [19]
Esler

[11] 3,876,495
[45] Apr. 8, 1975

[54] FOAMED PLASTIC WELTING CORD

[75] Inventor: David H. Esler, Grand Rapids, Mich.

[73] Assignee: Sackner Products, Inc., Grand Rapids, Mich.

[22] Filed: Aug. 21, 1972

[21] Appl. No.: 282,327

Related U.S. Application Data

[63] Continuation-in-part of Ser. No. 37,253, May 14, 1970, abandoned.

[52] U.S. Cl. ............... 161/178; 161/172; 161/180; 260/2.5 R; 264/51; 264/54; 264/209
[51] Int. Cl. ............................................ D02g 3/00
[58] Field of Search .......... 161/101, 139, 178, 180, 161/160, 175, 159; 264/51, 54, 173, 209; 260/2.5 R, 2.5 A; 36/57

[56] References Cited
UNITED STATES PATENTS

| 2,932,121 | 4/1960 | Weitzel | 161/101 |
| 3,009,209 | 11/1961 | Weinbrenner et al. | 264/54 |
| 3,299,192 | 1/1967 | Lux | 264/209 |
| 3,507,741 | 4/1970 | Alexo | 161/175 |
| 3,592,720 | 7/1971 | Wattles et al. | 161/101 |

FOREIGN PATENTS OR APPLICATIONS

| 19,616 | 8/1968 | Japan | 161/178 |
| 913,685 | 12/1962 | United Kingdom | 264/54 |

*Primary Examiner*—George F. Lesmes
*Assistant Examiner*—Paul J. Thibodeau
*Attorney, Agent, or Firm*—Price, Heneveld, Huizenga & Cooper

[57] ABSTRACT

A foamed, extruded, polymeric welting cord provided with a non-slipping exterior surface comprising cells which are non-linearly oriented and are not elongated. In one form, the welting cord is hollow having a passageway approximately centered therein. In another form, the cord includes a reinforcing member formed from a plurality of polyester fibers centered therein and extending substantially along the entire length thereof.

18 Claims, 7 Drawing Figures

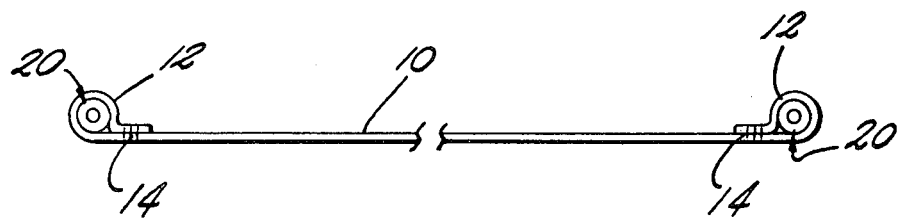
FIG. 1
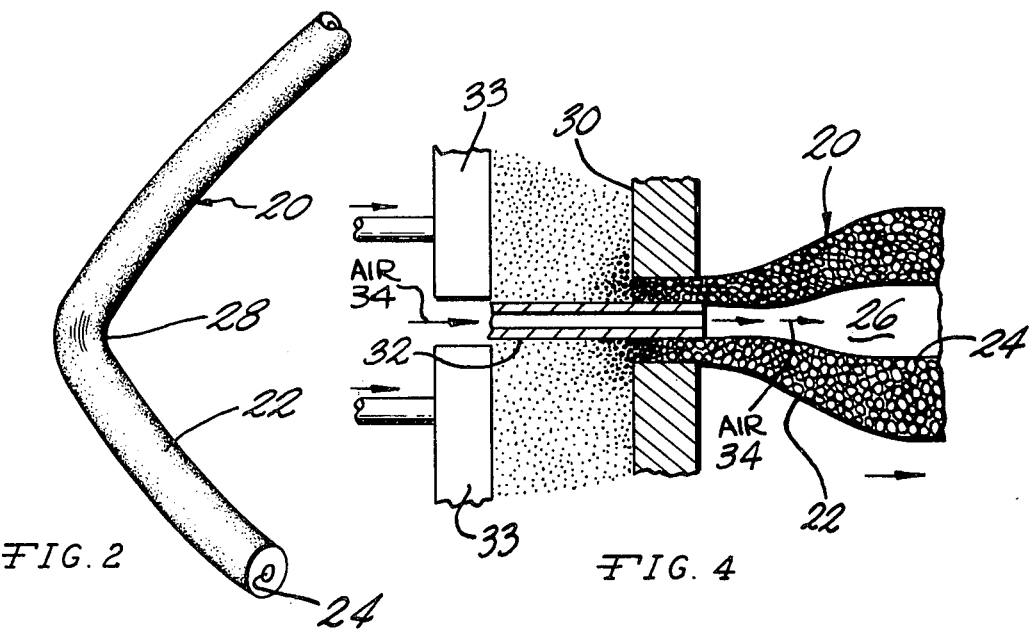
FIG. 2
FIG. 4
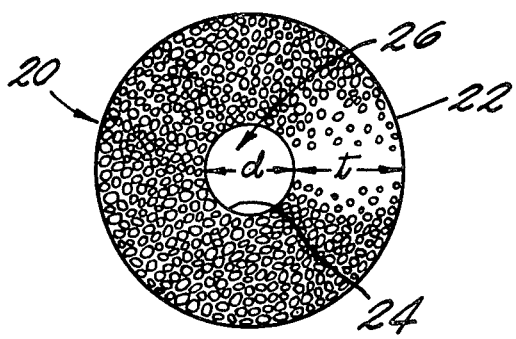
FIG. 3

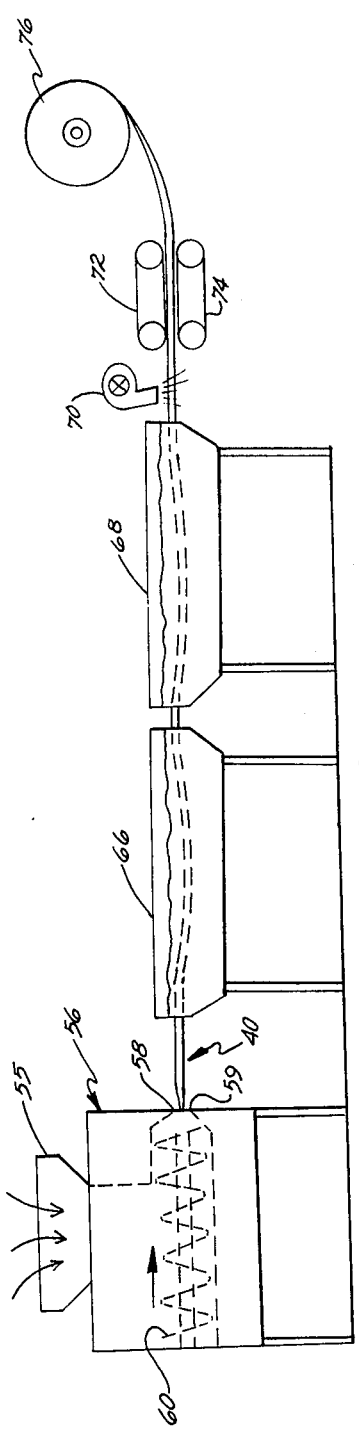
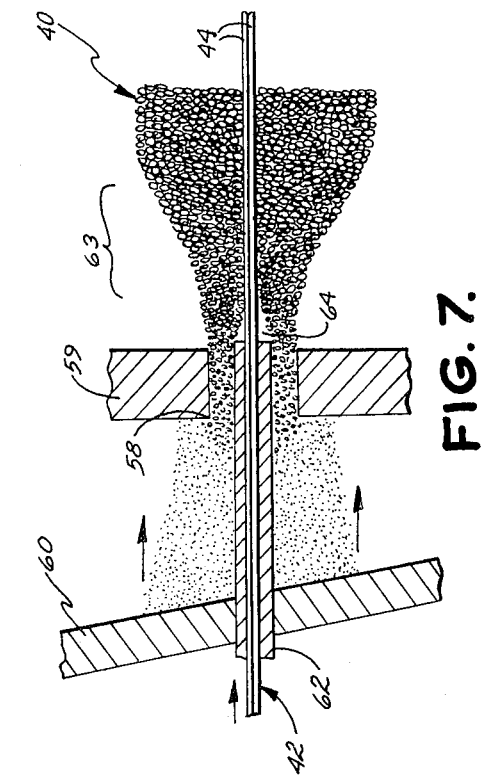
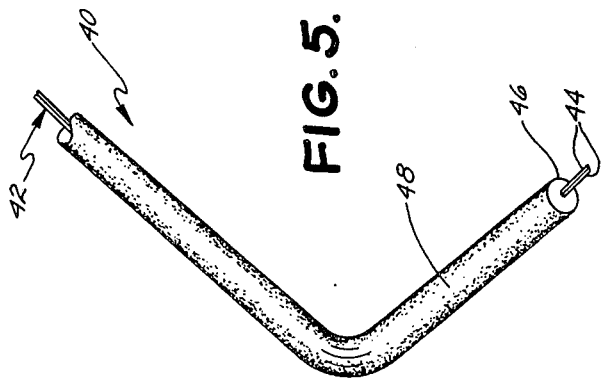
FIG. 6.
FIG. 7.
FIG. 5.

FOAMED PLASTIC WELTING CORD

BACKGROUND OF THE INVENTION

This is a continuation-in-part of my previously filed application Ser. No. 37,253, filed May 14, 1970, now abandoned.

For many years, welting cords of the type utilized in forming boxing strips for upholstered cushions have been constructed from crumpled or twisted paper. See, for example, U.S. Pat. No. 3,445,004. Although such welting cords have performed satisfactorily, they have had certain characteristics which could be improved upon. For example, the paper does not in all cases twist or crumple in such a manner as to provide uniform thickness and resiliency, and when pulled apart the paper cords tended to fray. Where a white welting cord was desired, the paper had to be bleached.

Recently, foamed polyethylene and ethylene vinyl acetate copolymer welting cords have been provided as a substitute for the paper cord. Such cords avoid the disadvantages set forth concerning the paper cord, but at the same time introduced certain disadvantages. Thus, such cords are limited in their resiliency. Also, by forming the cords from copolymers, the price is increased. Such cords, when forming a 90° corner, bulge outwardly a considerable extent thereby reducing their utility in applications where bending around small radius curves as well as reducing the aesthetic appeal of the resultant product.

Another problem with solid welting cords is that only external splicing such as the taping of butt joints is possible. Such taping is not completely satisfactory for outdoor furniture which experiences a high degree of moisture contact.

Also, the particular solid foamed cord previously referred to has been provided with a generally smooth surface which is undesirable due to the fact that a smooth surfaced cord tends to slip relative to the fabric when the boxing strip is formed as described in the aforesaid U.S. patent.

Finally, many of the previously known formed cords have been very susceptible to stretching and fracturing due in part to a lack in tensile strength of the polymeric material. Thus, in an attempt to overcome this problem, since the filing of my parent application, reinforced cords having fiberglass fibers embedded therein have been produced. These cords are formed from copolymers with generally smooth surfaces as described above. Accordingly, these reinforced cords have also been very expensive and not well adapted for cooperation with upholstery boxing strips and the like. Additionally, when the formed copolymer of these reinforced cords has worn thin, the fiberglass fibers, being relatively stiff and inflexible, have tended to protrude through the upholstery causing discomfort to persons seated thereon.

SUMMARY OF THE INVENTION

Accordingly, this invention concerns a foamed plastic welting cord which is improved over the prior foamed cords so as to avoid the disadvantages set forth above. Specifically, in one form of the invention there is provided an improved welting cord formed from foamed, flexible polymeric plastic, the improvement comprising the cord being hollow with a passageway approximately centered in the cord, and having an exterior surface especially adapted to cooperate with an upholstery boxing strip. In another form of the invention, there is provided a welting cord formed from foamed flexible polymeric plastic and including a reinforcing member formed from flexible, polyester fibers approximately centered in the cord and extending along the entire length thereof. The reinforcing member significantly increases the strength of the cord while being sufficiently flexible to avoid the protruding effect described above.

Therefore, it is an object of the invention to provide an improved foamed welting cord having improved resiliency under crushing so as to maintain the generally cylindrical shape of the cord.

Another object of the invention is to provide such an improved cord wherein the exterior surface is velvety rather than smooth so as to prevent slippage of the cord in the boxing strip.

Yet another object of the invention is to provide such an improved welting cord which is capable of internal splicing as well as external splicing.

A further object of the invention is to provide a significantly strengthened foamed welting cord including internal flexible, reinforcing members.

A related object of the invention is to provide such an improved welting cord wherein the materials utilized are inexpensive, thereby reducing the cost of manufacturing.

A further object is to provide a process for producing such cords.

Other objects and advantages will become apparent upon reference to the following drawings and detailed discussion.

BRIEF DESCRIPTION OF THE DRAWINGS

FIG. 1 is an end elevational view of a boxing strip formed utilizing the foamed welting cord constructed in accordance with the invention;

FIG. 2 is a fragmentary perspective view of the improved welting cord of the invention;

FIG. 3 is an enlarged end elevational view of the cord shown in FIG. 2;

FIG. 4 is a fragmentary, schematic elevational view, in section, illustrating the process of forming the improved welting cord of the invention;

FIG. 5 is a fragmentary perspective view of the reinforced welting cord;

FIG. 6 is a schematic view illustrating the process of making the reinforced welting cord of FIG. 5; and FIG. 7 is an enlarged fragmentary, schematic, elevational view, in cross-section, illustrating a portion of the process shown in FIG. 6.

DESCRIPTION OF THE PREFERRED EMBODIMENTS

Hollow Welting Cord

The welting cord provided by the invention is utilized in a conventional boxing strip comprising a fabric 10, the edges 12 of which are folded over the welting cord 20 of the invention. The edges 12 are attached at their very ends to the fabric 10 by means such as glue or stitching 14. The boxing strip is then combined with other fabric pieces to enclose an upholstered cushion.

In accordance with one aspect of the invention, the welting cord 20 is a foamed flexible polymeric cord which has been improved so as to be shaped as a hollow cord, such as a hollow cylinder. Specifically, the cord 20 has an exterior surface 22 and an interior surface 24, the latter of which forms a passageway 26 which is approximately centered within the cord 20. The surfaces 22 and 24 thus define the walls confining the foamed material of the cord. The cells of the material comprising the cord are substantially uniform in size throughout. Such uniform cell size provides uniform crush recovery to the cord when it is used in upholstery.

In accordance with another aspect of the invention, the exterior surface 22 has been formed so as to be velvety in character. By way of explanation, I have discovered that the smoothness of the exterior surface of previously referred to solid foamed cord discussed in the "Background of the Invention" is due to the linear orientation of the cells defining the exterior surface of that cord, such linear orientation being a function of the speed of withdrawal of the foamed cord from the dies relative to the speed of extrusion. A speed of withdrawal which exceeds the extrusion speed tends to elongate, in a linear direction paralleling the axis of extrusion, the cells on the surface of the cord. This greater speed of withdrawal was heretofore necessary at least in part due to the tendency of solid cords to sag by their weight. By making the cord hollow, the weight is drastically reduced, and thereby I was able to greatly reduce the speed of withdrawal. Consequently, the linear orientation has been reduced in my cord and the exterior surface formed is velvety in character.

Another way of explaining this phenomenon is to define the amount of the excess speed of withdrawal by the amount of draw-down which occurs in the extruded cord. "Draw-down" as used in this sense in this application means the decrease in cord diameter created by stretching the extruded cord as a result of such excess withdrawal speed, usually expressed as a percentage, from that diameter which otherwise would be obtained from the extruding and foaming operation if the extruding and withdrawal speed of the extruded cord were the same. Thus, I have found that one way to insure that the cord produced has the proper velvet surface characteristics is to limit the amount of draw-down to an amount which does not exceed about 15 percent.

The exterior surface 22 of the present invention features cells throughout the entire exterior surface which are generally spherical in shape. It is these sperical shaped cells which provide the velvety feel to the cords, which in turn prevents slippage of the cord when the cord is combined with a boxing strip in upholstering operations.

As described above, another desired feature of the foamed welting cord of the invention is its hollow nature. For best results, such as resiliency under crushing, it has been found that the diameter "d" of the passageway 26 should be less than or equal to the thickness "t" of the material between the walls 22 and 24 (FIG. 3). Thus, particularly for cords wherein the passageway 26 is centered therein, the diameter "d" will be less than or equal to one third of the entire diameter of the cord as measured across the exterior surface 22. It has been found that hollow cords of this nature produce a round corner 28 (FIG. 2) at which any tendency to bulge outwardly is substantially reduced, resumably due to the ability of the hollow cord to collapse upon itself. Such as improved corner 28 is desirable as it provides by its continued roundness an improved corner in the upholstery.

It will be appreciated that the hollowness of the cord need not depend upon only one passageway. Thus, a plurality of longitudinal passageways can be utilized, provided the wall thicknesses are such that they resist breaking when the cord is flexed or compressed.

The material utilized for the extruded cord 20 should be a flexible foamable polymer. Low density polyethylene has been found to be very effective. Other suitable expandable, flexible materials within this category are high density polyethylene, polypropylene, polyvinyls and specifically polyvinylchloride, polyurethane, and polybutylene, to name some. It should be understood that within certain aspects of this invention it is important that the material is only a single polymer and not a copolymer or a combination of two or more copolymers.

Method Of Making The Hollow Welting Cord

The process by which the foamed, extruded cord 20 is made will now be described. Pellets of the polymeric material are mixed with a suitable blowing agent within a housing or container, the blowing agent being used only in sufficient quantity to foam the polymeric material. The mixture is then heated to a temperature sufficient to completely decompose the agent and thereafter the mixture is extruded in a well-known way through a die 30 (FIG. 4) having centered therein a needle mandrel 32. FIG. 4 schematically shows the pressure for extrusion being exerted by rams 33, whereas in actual practice a screw is used. Air is allowed into the center of the needle mandrel 32 as indicated by the arrow 34, which air insures that the material when extruded will form a tubular or hollow cord. As soon as the material of the mixture is extruded out of the die 30, expansion takes place due to the pressure of the gas generated by the blowing agent. Before that, expansion is prevented by the pressure built up within the die. It will be readily appreciated that expansion after extrusion occurs in all three dimensions, and because of the presence of the air delivered by the mandrel 32, the passageway 26 is maintained within the cord 20. As the cord is formed, it is withdrawn from the die 30, preferably at a rate closely matching the previously referred to normal extruding rate which is the rate of formation of the cord due to the extrusion and the forming. Specifically, the foamed and extruded cord 20 should not be drawn away from the die 30 in such a manner to cause a draw-down which would exceed 15 percent. agent. Before In the above-described process, the blowing agent used is critical in certain respects which will now be discussed. The agent must have the characteristics also of a nucleating agent to insure that uniform cell size is obtained, and the decomposition of the agent must be controllable to a relatively slow rate to prevent holes from being blown radially through the cord. Both of these critical characteristics are obtained in the working example hereinafter set forth by using two blowing agents, one of which is talc-like in nature so as to provide nuclei for cell formation. One of the blowing agents, such as the nuclei-providing agent, also has a higher decomposition temperature so as to slow down the total decomposition to a controllable rate. Preferably, that higher temperature is such that the agent decomposes only because of the previous decomposition of the other agent having the lower decomposition temperature. A ready method of accomplishing this is to pick a lower decomposing agent having an exothermic decomposition reaction sufficient to raise the temperature of the mixture to that necessary to decompose at least a portion of the higher decomposing agent.

With the preceding limitations as the preferential requirements then, any blowing agent can be selected in the amount necessary to produce the proper controlled foaming. It should be noted that a separate non-decomposing nucleating agent can also be used.

Certain benefits are obtained from this process, such benefits being related to the characteristics of the hollow foamed cord so produced. That is, first of all, all of the expansion occurs after the extrusion, thereby avoiding any further extrusion of the type which would cause the cells of the surface 22 to linearly elongate or orient parallel to the axis of the cord. Secondly, the fact that cord 20 is hollow allows the expansion to occur as described in all three dimensions, thereby assuring that the cell size of the foamed material will be uniform throughout. In contrast, elimination of the passageway 26 would prevent the cells in the center of the core 20 from expanding completely, thus producing a non-uniform cell size in the cord.

To better illustrate the aforedescribed process, a working example will now be set forth. This example is only one of many which can be utilized, depending upon the variations given to the variables described.

EXAMPLE I

Low density polyethylene in pellet form was mixed with blowing agents azodicarbonamide and p, p'-oxybis (benzene sulfonyl hydrazide) (hereinafter called "hydrazide") in the following percentages by weight: polyethylene, 98 percent; azodicarbonamide, 0.5 percent; and "hydrazide", 1.5 percent. The percentages of these blowing agents can be varied plus or minus 10 percent and still provide adequate foaming. This mixture was obtained by tumbling the blowing agents and pellets until the pellets are completely coated, after which the mixture was placed in an extruder where it was heated to approximately 320°F., at which temperature the blowing agent "hydrazide" decomposed. The decomposition occurs exothermically so as to raise the temperature of the mixture by the heat so generated, to about 385°F. at which temperature at least a portion of the azodicarbonamide decomposes. The total decomposition thus produces the gases nitrogen, carbon monoxide, carbon dioxide, and various solid decomposition products as are well-known to chemists skilled in the art. Pressure of up to 1,000 p.s.i. was provided by the extruding screw at which time the heated material was extruded through the dies 30 around the needle mandrels 32. The pressure inside the die prevented expansion from occurring until after extrusion. Utilizing a plurality of die openings to form a plurality of strands at a time each having a final diameter of 5/32 inch, resulted in a rate of production of about 625 yards per hour per die opening. The resulting cords had a density in the walls of about 0.3 grams per cubic centimeter. The amount of "impurities" left in the cord comprising the solid decomposition products from the blowing agents amounted to approximately 1.6% of the final weight of the cord, which figure is essentially negligible compared to the polyethylene weight and had no measurable effect on the performance of the resultant cord.

It will be readily appreciated that the aforedescribed cord and the process for making it produced the following advantages. By reason of its shollow construction, the cord has a resiliency which is superior to that obtainable by a solid cord, thus providing improved crushed recovery. This resiliency, of course, arises from the fact that the cells of a hollow cord are not crushed to the same extent as those of a solid cord, even for the same amount of exterior deformation. The resiliency and the hollowness of the cord allow the cord to bend around a 90° angle without producing side flexing or bulging of the type which destroys the roundness of the cord. The hollow nature of the cord also allows it to be spliced internally by inserting a splint in the passageway 26. Because the cord is produced in hollow form, there is less weight to the cord, thereby eliminating the need for excessive withdrawal of the cord from the die, which in turn along with expansion after extrusion eliminates linear elongation or orientation of the cells on the surface of the cord. The elimination of such elongation and orientation allows the natural spherical shape of the foamed cells to give the exterior surface a velvet texture that insures non-slippage of the cord when it is combined with the boxing strips. Yet another advantage, at least when low density polyethylene is utilized, is that the cord can be produced utilizing a single chemical rather than a copolymer, thereby producing the cord inexpensively.

Reinforced Welting Cord

Referring now to FIG. 5, another form of the present invention comprises the reinforced, foamed welting cord 40. As mentioned in connection with the hollow welting cord 20, the reinforced cord is especially adapted to be used in conjunction with an upholstery boxing strip 10, as shown in FIG. 1, although the cord may be used in other applications as will be apparent to those skilled in the art.

The reinforced, foamed welting cord 40 is a foamed, flexible, polymeric cord having an internal reinforcing element or member 42 including a plurality of flexible polyester fibers or mono-filaments 44 assembled together in a bundle. The bundle of filaments 44 is approximately centered within the foamed cord 40 and extends along the entire length thereof. As shown in FIGS. 5 and 7, the diameter of the bundle of fibers 44 is much less than either the diameter of the entire cord 40 or the thickness of the wall or body of the cord 46 surrounding the bundle of filaments. The polyester fibers are sufficiently flexible so that they will not protrude through any covering fabric should the polymeric cord body wear thin. Thus, they will not cause discomfort for persons sitting on the upholstery as will cords including stiffer reinforcing elements such as fiberglass fibers.

The body 46 of the cord comprises a plurality of cells of the foamed polymeric material from which the cord is extruded, which cells are all substantially uniform in size throughout the cord. Generally, the cells are sperical in shape, especially on the exterior surface 48, which shape produces the non-smooth surface texture. As mentioned above in connection with the hollow welting cord 20, the uniform cell size along with the generally spherical cell shape provide a uniform crush recovery for the cord when it is used in upholstery and other applications, while the spherical cells exposed on the surface 48 of the cord prevent the slippage of the cord through the upholstery boxing strips when the cord is combined therewith. The spherical cell shape results from the maintenance of the speed of withdrawal of the foamed reinforced cord from the extrusion die at a rate not exceeding 15 percent of the speed of extrusion. Thus, when the withdrawal speed is kept within this limitation, the cells are kept from being oriented in a linear direction parallelling the axis of extrusion and are allowed to take on their generally spherical, uniform shape resulting in the specific non-slipping advantages described above.

Further, it has been found that with the inclusion of the reinforcing member 42, the reinforced cord 40 retains a resiliency under crushing similar to that of the hollow welting cord 20 described above. Thus, the reinforced welting cord also produces a rounded corner having few bulges or wrinkles in the cord even when bent around a small radius curve. The reinforced cord does not bulge, flatten out or collapse when bent, but retains its full, rounded form thereby producing a stable, aesthetically pleasing upholstery welt.

It will be appreciated that the specific advantages described above for the reinforced welting cord do not depend merely on a single reinforcing member or bundle of fibers, but may be accomplished by embedding a plurality of fibers at various locations within the interior of the cord 40. However, the location of all of the strengthening or reinforcing fibers 44 within the center of the cord greatly facilitates the extrusion of the cord, as will be described more fully below.

The materials utilized for the reinforced extruded foamed cord 40 include flexible, foamable polymers. Preferably, low density polyethylene is used. Other suitable expandable, flexible materials within this category are high density polyethylene, polypropylene, polyvinyls and specifically polyvinylchloride, polyurethane and polybutylene. It should be understood that the advantages of the reinforced cord are obtained utilizing only a single polymer and not from the combination of two or more copolymers. Thus, the specific advantages of the cord are accomplished while retaining significant economic advantages in the much lower cost of the single polymer.

Method Of Making The Reinforced Welting Cord

Referring now to FIGS. 6 and 7, the process of forming the reinforced, foamed polymeric welting cord 40 is shown. Pellets of the single polymeric material, preferably low density polyethylene, are mixed with a suitable blowing agent in a container or other enclosure, a sufficient amount of the blowing agent being used to cause the polymeric material to be foamed. The blowing agents are generally powdered materials and the mixing is preferably accomplished by tumbling the pellets with the agents thereby coating the pellets evenly over their entire surfaces. The ambiant or room temperature mixture is then dumped into the hopper 55 of a conventional, well-known screw type extruder 56 wherein the mixture is heated by setting the temperature of the extruder to approximately 340°F. The heating of the mixture is sufficient to decompose at least one of the two components included in the blowing agent, the first component of the agent reacting in an exothermic chemical reaction thereby raising the temperature of the mixture sufficiently to cause the decomposition of the second component of the blowing agent. Thus, the decomposition of the agent is controlled by means of the two step decomposition and thereby takes place at a relatively slow rate in order to prevent excess pressure from building up within the cord which might otherwise cause holes to be blown radially through the cord as it is extruded. Preferably, as described above in connection with the hollow welting cord manufacture, the second blowing agent component, having a higher decomposition temperature, is also a nucleating agent which provides the nuclei for the formation of cells in the extruded foamed reinforced cord. Although the exothermic reaction of the first component of the blowing agent may not be sufficient to decompose the entirety of the second component thereof, the first component should be chosen so as to cause at least a partial decomposition of the second component. Further, it has been found that the two component blowing agent described above produces the best results when forming the welting cord from a single polymer. Other types of blowing agents are unable to provide the advantages and uniform cell shape and size or the desirable non-smooth surface texture.

Following the heating of the mixture in the extruder 56, the mixture is extruded through a single opening 58 in extruder die 59 by a conventional screw-type extruder auger 60. Simultaneously with the extrusion through the single opening 58, the reinforcing member 42 comprising the bundle of polyester fibers 44 is drawn and fed at a rate of speed equivalent to the speed of the extrusion through a needle mandrel 62 approximately centered in the opening 58. In addition to strengthening the completed reinforced cord 40, the reinforcing member 42 is the primary reason enabling the extrusion to be accomplished at rates approximating 350 feet per minute since the reinforcing member acts as a carrier and support for the cord at it is withdrawn away from the die 59 of the extruder 56. As the heated mixture is extruded through opening 58, over and around needle mandrel 62, the extrusion takes the form of an elongated, continuous cylinder with the reinforcing member 42 approximately centered therein.

Immediately after the extrusion of the cord, the action of the blowing agents causes the cord to expand in three dimensions forming a continuous, cylindrical cord having uniform cell size through out. As shown in FIG. 7, the expansion of the cord in the area 63 includes the internal expansion of the cells into the space 64 left by the mandrel 62 during the extrusion of the cord. Thus, the reinforcing member 42 is securely retained in the center of the cord by the cells as they expand in the three dimensions.

As the cord expands following its extrusion, it is withdrawn away from the die 59 at a draw-down not exceeding 15% as explained above in connection with the hollow welting cord 20. Thus, the cells are not linearly oriented in the completed cord but have a spherical, uniform shape providing the exterior surface 48 of the cord with a non-smooth surface texture especially advantageous in cooperation with upholstery boxing strips. Thus, the withdrawal speed from die 59 is preferably closely matched with the normal extruding rate which, in the reinforced cord process, is approximately 350 feet per minute.

Since the reinforced cord is extruded at such high rates of speed, it cannot withstand shock cooling and therefore is preferably quenched first in a hot water bath 66 wherein the continuous, cylindrical cord 40 is drawn therethrough. Following the immersion in the hot water bath 66, cord 40 is drawn through an ambient or room temperature bath 68 after which the continuous cord is blown dry with an air blower 70. The temperature of the warm bath is preferably approximately 150°F. whereas the room temperature or ambient bath is approximately 65°–70°F. Motive power for drawing the reinforcing member 42 through needle mandrel 62 and the cord 40 away from the die 59 and through the successive baths 66 and 68 is provided by opposing belt rollers 72 and 74 which grasp and engage the continuous cylindrical reinforced cord. Thereafter, the cord is wound on a take-up reel 76.

A better illustration of the above-described reinforced welting process is provided by the following working example. This example is merely typical of many which may be utilized depending on the variance of the several variables involved.

EXAMPLE II

Low density polyethylene, commercially known as REXALL No. 143 polyethylene obtained from Rexine Polymers, Inc., Melrose Park, Illinois, was mixed by tumbling with a two-component blowing agent including azodicarbonamide and p, p'-oxybis (benzine sulfonyl hydrazide, hereinafter referred to as "hydrazide") in the following proportions: 110 grams of azodicarbonamide, 350 grams of hydrazide, mixed with 50 lbs. (22,700 grams) of polyethylene. These amounts are equivalent to approximately 98 percent polyethylene, 1.5 percent hydrazide, and 0.5 percent azodicarbonamide or a ratio of 196:3:1, respectively. The blowing agents are commercially obtainable from UniRoyal of Naugatuck, Connecticut, under the trade names of Celogen O T (hydrazide) and Celogen AZ (axodicarbonamide). A variance in these blowing agents of approximately 10 percent will still provide adequate foaming of the polymer.

The mixture was tumbled to completely coat the polyethylene pellets, after which the mixture was dumped into the extruder and heated to approximately 340°F. at which temperature the hdyrazide decomposed. The exothermic decomposition of the hydrazide generates heat raising the mixture temperature to approximately 360°F., at which temperature at least a portion of the azodicarbonamide decomposes. Although the azodicarbonamide alone generally has a higher decomposition temperature than the 360°F., mixtures of the hydrazide with the azodicarbonamide reduce the decomposition temperatures somewhat. The entire decomposition process produces nitrogen, carbon monoxide, and carbon dioxide gases as well as various solid decomposition products which are well known to chemists skilled in the art. The various gases cause a foaming of the mixture around the nuclei provided by the nucleating agent azodicarbonamide. A pressure of approximately 2,000 p.s.i. was provided by the extruding screw as the heated, foamed material was extruded through the single die opening 59 around and over the needle mandrel 62. The pressures within the extruder prevent the expansion of the cells until after the extrusion.

Simultaneously with the extrusion, the reinforcing member 42 comprising the bundle of polyester fibers 44 was drawn and fed through the needle mandrel 62 into the center of the extruded cord. Utilizing the single die opening, the rate of production is approximately 350 feet per minute. This greatly increased speed over the production speed utilized with the hollow welting cord process, described above, is accomplished because of the supporting and carrying effect of the reinforcing element or member inserted in the center of the extruded cord.

Following the expansion of the cord, the cord was drawn through and immersed in hot water approximating 150°F. for approximately 15 feet beginning approximately 6 inches from the opening of the extruder. Subsequent to the immersion in hot water, the cord was drawn through room temperature water of approximately 65°–70°F. after which it was blown dry and rolled on take-up spools.

As described above, the draw-down was kept to a maximum of 15% to provide the uniform, spherical cells with the attendent advantages described above. The resulting cord had a density of approximately 0.3 grams per cubic centimeter with an average pore or cell size of 5 to 6 mils and a percent of voids of approximately 56 percent. The total of impurities left in the cord resulting from the blowing agents is approximately 2 percent thereby comprising an essentially negligible amount causing no measurable effect on the performance of the resulting cord.

Thus, the production of the reinforced welting cord is accomplished at a significantly greater speed due to the supporting and carrying effect of the reinforcing member 42. The resulting cord is significantly strengthened by the inclusion of the bundle of polyester filaments 44 thereby providing a stronger, more durable cord for use in various applications. Holding the draw-down to a maximum of 15 percent provides the exterior surface of the cord with the desirable, non-smooth, superior qualities advantageous in upholstering and other applications. Further, the resiliency and crushing recovery of the cord are excellent and allow the cord to be bent around even small radius curves without any side flexing or bulging destroying the roundness of the bent cord. Additionally, the use of the two component blowing agent allows the cord to be produced from a single polymer thereby allowing it to be manufactured much less expensively than other existing foamed cords.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A welting cord formed from a single foamed, flexible polymer; said cord having a longitudinal axis and including strengthening means approximately centered therein and an exterior surface having cells of a generally uniform shape providing a non-smooth texture especially adapted to prevent slippage of the cord when combined with an upholstery boxing strip; said strengthening means including a plurality of flexible, reinforcing filaments embedded within and extending along the entire length of said cord; said non-smooth surface texture being chacterized by non-linear oriented, generally spherical cell shapes on said surface, said cord being formed with a draw-down during manufacture not exceeding about 15% preventing said cells at least on said surface from being oriented parallel to said axis.

2. A welting cord formed from a single foamed, flexible polymer, said cord having a longitudinal axis, being hollow, and including an exterior surface having a non-smooth texture especially adapted to prevent slippage of the cord when combined with an upholstery boxing strip, said surface texture characterized by non-linear, oriented generally spherical cell shapes at least on said surface; means for internally splicing said cord including a passageway approximately centered therein and strengthening means within said passageway; said strengthening means comprising a reinforcing splint located within at least a portion of the length of said passageway and allowing said cord to be internally spliced by insertion and securement of said splint in the corresponding passageways of other lengths of said cord.

3. The welting cord of claim 2 wherein said cord has walls of a predetermined thickness; said passageway having a diameter less than or equal to said wall thickness.

4. The welting cord of claim 3 wherein said non-smooth surface texture is characterized by non-linear cell shapes resulting at leasat in part from a draw-down of said cord during manufacture not exceeding about 15 percent.

5. The welting cord of claim 4 wherein said cells forming said cord are substantially uniform in size throughout.

6. The welting cord of claim 5 wherein said cord consists essentially of polyethylene having a density of approximately 0.3 grams per cubic centimeter.

7. The welting cord of claim 1 wherein said reinforcing filaments comprise a bundle of filaments wound together and approximately centered within said cord.

8. The welting cord of claim 7 wherein said cells forming said cord are substantially uniform in size throughout.

9. The welting cord of claim 8 wherein said reinforcing filaments comprise a plurality of polyester fibers; the cord body surrounding said reinforcing filaments consisting essentially of low density polyethylene.

10. In a welting cord having a longitudinal axis and formed from foamed, flexible, polymeric plastic, the improvement comprising said cord being hollow with a passageway approximately centered therein, the cells comprising at least the exterior surface of said foamed plastic cord being nonlinearly oriented such that they are other than parallel to said axis and generally uniform and spherical in shape; said cord having walls of a predetermined thickness; said passageway having a diameter less than or equal to said wall thickness.

11. In a welting cord formed from foamed flexible polymeric plastic, the improvement comprising said cord having a longitudinal axis and being hollow with at least one passageway therein wherein the exterior surface of said cord has a non-smooth texture especially adapted to prevent slippage of the cord when combined with an upholstery boxing strip; said exterior surface of said cord having a non-smooth texture characterized by non-linear oriented, generally spherical cell shapes on said surface, said cord being formed with a draw-down during manufacture not exceeding about 15% preventing said cells at least on said surface from being oriented parallel to said axis.

12. The improved welting cord as defined in claim 10 wherein the cells forming said foamed plastic are substantially uniform in size throughout.

13. The improved welting cord as defined in claim 10 wherein said plastic is foamed so as to provide within the walls of said cord a density of approximately 0.3 grams per cubic centimeter.

14. A reinforced, foamed flexible, polymeric welting cord including a cylindrical body having a longitudinal axis and an exterior surface having a non-smooth texture especially adapted to prevent slippage of the cord when combined with an upholstery boxing strip and flexible reinforcing means for substantially preventing the permanent stretching of said cord and for supporting said cord during the extrusion manufacture thereof; said reinforcing means being embedded within said cord and extending longitudinally for the entire length thereof; said reinforcing means including a reinforcing member approximately centered in said cord; said non-smooth surface texture characterized characaterized by non-linear oriented generally spherical cell shapes on said surface, said cord formed with a draw-down during manufacture not exceeding about 15% preventing said cells at least on said surface from being oriented parallel to said axis.

15. The welting cord of claim 14 wherein said member comprises a plurality of monofilaments wound into a bundle.

16. The welting cord of claim 15 wherein said monofilaments comprise polyester fibers.

17. The welting cord of claim 14 wherein said cells forming said body are substantially uniform in size throughout.

18. The welting cord of claim 14 wherein said body consists essentially of low density polyethylene having an average cell size of about 5.5 mils and about 56 percent voids.

* * * * *

UNITED STATES PATENT OFFICE
CERTIFICATE OF CORRECTION

PATENT NO. : 3,876,495
DATED : April 8, 1975
INVENTOR(S) : David H. Esler

It is certified that error appears in the above-identified patent and that said Letters Patent are hereby corrected as shown below:

Column 4, line 49;

"agent. Before" should be deleted.

Signed and Sealed this thirtieth Day of September 1975

[SEAL]

Attest:

RUTH C. MASON
Attesting Officer

C. MARSHALL DANN
Commissioner of Patents and Trademarks